(12) United States Patent
Tanno et al.

(10) Patent No.: US 11,710,588 B2
(45) Date of Patent: Jul. 25, 2023

(54) COMPOSITE MAGNETIC SHEET AND FORMING METHOD OF COMPOSITE MAGNETIC SHEET

(71) Applicant: TOKIN CORPORATION, Sendai (JP)

(72) Inventors: Keitaro Tanno, Tokyo (JP); Shun Mikoshiba, Tokyo (JP); Kenichi Chatani, Tokyo (JP)

(73) Assignee: TOKIN CORPORATION, Miyagi (JP)

( * ) Notice: Subject to any disclaimer, the term of this patent is extended or adjusted under 35 U.S.C. 154(b) by 5 days.

(21) Appl. No.: 17/346,566

(22) Filed: Jun. 14, 2021

(65) Prior Publication Data
US 2022/0399144 A1     Dec. 15, 2022

(51) Int. Cl.
| | |
|---|---|
| H01F 1/28 | (2006.01) |
| H01F 41/02 | (2006.01) |
| B29C 51/00 | (2006.01) |
| B29C 51/02 | (2006.01) |
| B29L 7/00 | (2006.01) |
| B29K 33/00 | (2006.01) |
| B29K 505/00 | (2006.01) |
| B29K 63/00 | (2006.01) |

(52) U.S. Cl.
CPC ............ *H01F 1/28* (2013.01); *B29C 51/002* (2013.01); *B29C 51/02* (2013.01); *H01F 41/02* (2013.01); *B29K 2033/08* (2013.01); *B29K 2063/00* (2013.01); *B29K 2505/00* (2013.01); *B29K 2995/0008* (2013.01); *B29L 2007/002* (2013.01)

(58) Field of Classification Search
CPC ......... B29C 51/002; B29C 51/02; H01F 1/28; H01F 41/02; B29K 2033/08; B29K 2063/00; B29K 2505/00; B29K 2995/0008; B29L 2007/002

See application file for complete search history.

(56) References Cited

U.S. PATENT DOCUMENTS

| | | | |
|---|---|---|---|
| 2005/0012652 A1* | 1/2005 | Wakayama | ............... H01F 1/26 342/3 |
| 2014/0218147 A1* | 8/2014 | Chatani | ............... H01F 17/0013 336/20 |
| 2017/0110231 A1* | 4/2017 | Matsutomi | .......... H01F 1/14733 |
| 2017/0117081 A1* | 4/2017 | Chatani | ............... H05K 9/0075 |
| 2017/0271062 A1* | 9/2017 | Furukawa | ............ H05K 9/0075 |
| 2020/0082963 A1* | 3/2020 | Su | ............... H01F 1/24 |
| 2020/0111593 A1* | 4/2020 | Chatani | ............... H01F 1/14775 |

FOREIGN PATENT DOCUMENTS

JP           6526471 B2     5/2019

* cited by examiner

*Primary Examiner* — Joseph S Del Sole
*Assistant Examiner* — Baileigh Kate Darnell
(74) *Attorney, Agent, or Firm* — Holtz, Holtz & Volek PC

(57) ABSTRACT

A forming method of a composite magnetic sheet. The forming method comprises a preparing step, a forming step and a heat-treating step. In the preparing step, magnetic slurry is prepared by mixing at least a soft magnetic powder having a flat shape, a first resin having a solid component and a second resin having a solid component, weight loss of the solid component of the first resin being 4.0% or less at 220° C., weight loss of the solid component of the second resin being 5.0% or more at 220° C. In the forming step, the magnetic slurry is formed into an intermediate body having a sheet-like shape. In the heat-treating step, the intermediate body is heat-treated at a heat-treatment temperature between 220° C. and 400° C. (both inclusive).

6 Claims, 6 Drawing Sheets

COMPOSITE MAGNETIC SHEET AND FORMING METHOD OF COMPOSITE MAGNETIC SHEET

BACKGROUND OF THE INVENTION

This invention relates to a composite magnetic sheet comprising a soft magnetic powder having a flat shape and a binder which binds the soft magnetic powder.

For example, this type of composite magnetic sheet is disclosed in JP 6526471 B (Patent Document 1), the content of which is incorporated herein by reference.

Patent Document 1 discloses a soft magnetic film (composite magnetic sheet) comprising soft magnetic particles each having a flat shape and a resin component which binds the soft magnetic particles to each other. For example, the composite magnetic sheet is incorporated in a circuit board of a digitizer when used.

According to Patent Document 1, when the composite magnetic sheet is made, gaps (pores) are created in the composite magnetic sheet. In an instance where volume ratio of the pores to the composite magnetic sheet (hereafter, referred to as "pore ratio") is high, the pores expand when a reflow process is performed to a circuit board in which the composite magnetic sheet is incorporated. This expansion of the pores causes problems. For example, the composite magnetic sheet might be separated from the circuit board. According to Patent Document 1, the aforementioned problems can be solved when the pore ratio is reduced to 2.5% or less.

However, even in an instance where the pore ratio is low, the composite magnetic sheet sometimes expands during the reflow process so that a good circuit board cannot be obtained.

SUMMARY OF THE INVENTION

It is therefore an object of the present invention to provide a composite magnetic sheet which is capable of reducing expansion thereof during a reflow process.

The inventors of the present application have studied the reason why a composite magnetic sheet expands during a reflow process. In this study, a composite magnetic sheet was made as described below. First, magnetic slurry was prepared. The magnetic slurry contained a soft magnetic powder, a binder resin, i.e. resin for binding the soft magnetic powder, and a viscosity improver made of resin. The magnetic slurry was applied on a substrate and was dried so that an intermediate body having a sheet-like shape was obtained. The obtained intermediate body was heat-treated so that a composite magnetic sheet was obtained.

The inventors of the present application made various composite magnetic sheets by using various kinds of binder resins and various kinds of viscosity improvers. The inventors of the present application have studied the relation between the used resins and the composite magnetic sheets which cause problems during the reflow process. As a result, the inventors of the present invention have determined that the thermo-gravimetric (TG) characteristics of the used resins and the temperature during the heat-treatment are related to the problem as described below.

Recently, a lead-free reflow process is performed when something is soldered on a circuit board. The lead-free reflow process is usually performed under a relatively high reflow temperature of 220° C. or more. In general, when resin is heated to a high temperature, gases are generated from volatile components (i.e. components which are chemically changed into gases) contained in the resin and from components such as a chemical compound generated from the resin under a high temperature. Hereinafter, this phenomenon is referred to as "decomposition" of the resin. The viscosity improver of the composite magnetic sheet is significantly decomposed at the reflow temperature described above, and the weight of the viscosity improver is lost on ignition. On the contrary, a heat-treatment for making a composite magnetic sheet is usually performed under a temperature of about 200° C. According to the consideration of the inventers of the present invention, the viscosity improver of the composite magnetic sheet is not sufficiently decomposed under this temperature of about 200° C. but is significantly decomposed during the reflow process which is performed after the composite magnetic sheet is incorporated in the circuit board. The decomposition of the viscosity improver during the reflow process generates gas in the composite magnetic sheet. According to the consideration of the inventers of the present invention, this generated gas causes the expansion of the composite magnetic sheet.

Based on the consideration described above, the inventers of the present invention have conceived that the heat-treatment for making the composite magnetic sheet is performed under a temperature equal to or higher than the reflow temperature, so that the expansion of the composite magnetic sheet caused by the decomposition of the viscosity improver is reduced during the reflow process.

The present invention is based on the conception described above. According to the present invention, the heat-treatment for making the composite magnetic sheet is performed under a temperature equal to or higher than a usual reflow temperature. The magnetic slurry contains a first resin as a binder component and a second resin as a viscosity improver. The first resin has TG characteristics such that it is hardly decomposed at the reflow temperature, so that the decomposition of the binder component is reduced during the reflow process. On the other hand, the second resin has TG characteristics such that it is significantly decomposed at the reflow temperature. Since the viscosity improver is sufficiently decomposed during the heat-treatment for making the composite magnetic sheet, generation of gas in accordance with the decomposition of the viscosity improver can be reduced during the reflow process. Specifically, according to the present invention, the forming method of the composite magnetic sheet described below can be provided as well as the composite magnetic sheet described below.

An aspect of the present invention provides a forming method of a composite magnetic sheet, the forming method comprising: mixing at least a soft magnetic powder, a first resin and a second resin to form magnetic slurry, the soft magnetic powder having a flat shape, the first resin having a solid component, weight loss of the solid component of the first resin being 4.0% or less at 220° C., the second resin having a solid component, weight loss of the solid component of the second resin being 5.0% or more at 220° C.; forming the magnetic slurry into an intermediate body having a sheet-like shape; and heat-treating the intermediate body at a heat-treatment temperature between 220° C. and 400° C. (both inclusive).

The composite magnetic sheet according to an aspect of the present invention is made of the magnetic slurry which contains the first resin and the second resin. Under a usual reflow temperature, the first resin is slightly decomposed, while the second resin is significantly decomposed in comparison with the first resin. Moreover, the heat-treatment for making the composite magnetic sheet is performed under a temperature equal to or more than the usual reflow temperature. According to this forming method, the first resin forms the binder of the composite magnetic sheet during the heat-treatment while being slightly decomposed. The thus-formed binder is hardly decomposed even during a reflow process. Moreover, the second resin is sufficiently decomposed in advance during the heat-treatment so that generation of gas in accordance with the decomposition of the second resin can be reduced during the reflow process. Thus, an aspect of the present invention provides the composite magnetic sheet which is capable of reducing expansion thereof during the reflow process.

An appreciation of the objectives of the present invention and a more complete understanding of its structure may be had by studying the following description of the preferred embodiment and by referring to the accompanying drawings.

Figure 1:
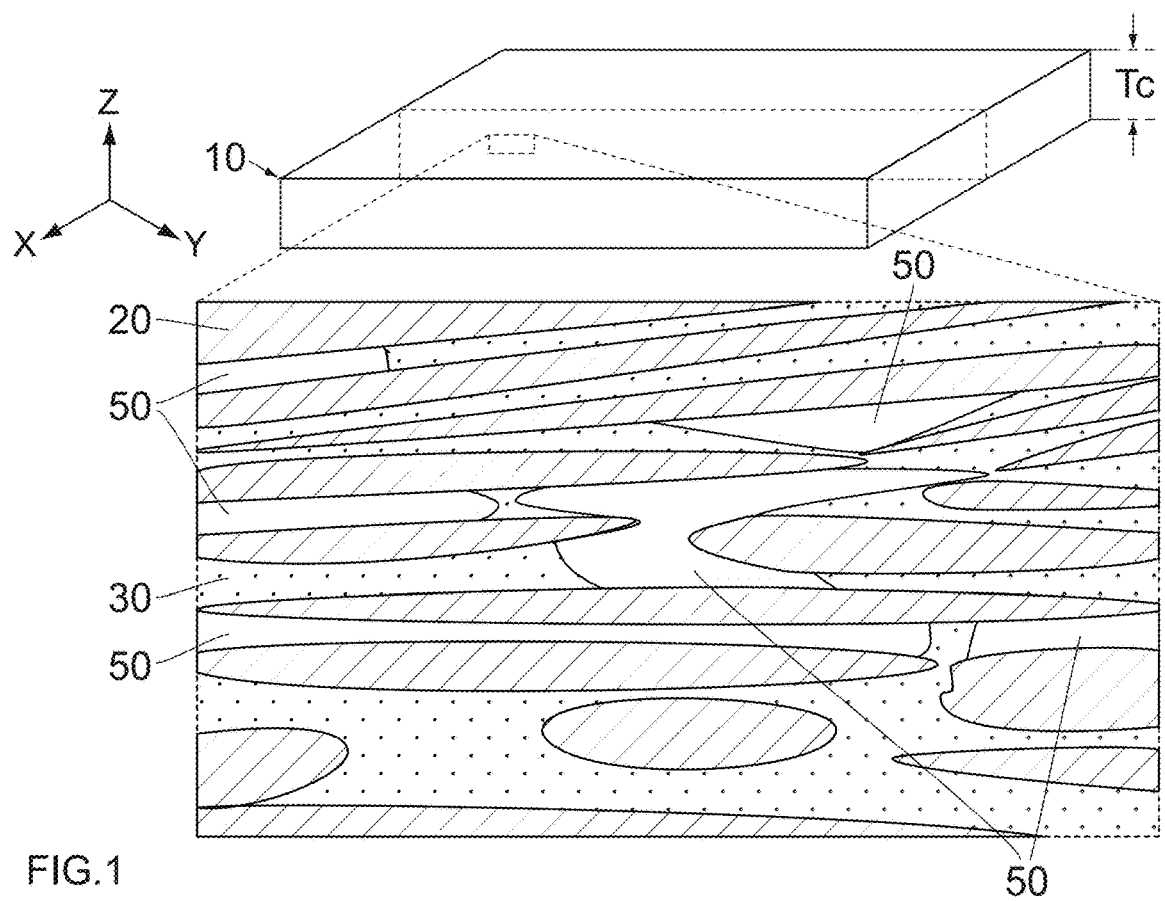
FIG. 1 is a perspective view schematically showing a composite magnetic sheet according to an embodiment of the present invention, wherein a part of a cross-section of the composite magnetic sheet (part enclosed by dashed line) is enlarged and schematically illustrated.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Referring to FIG. 1, a composite magnetic sheet 10 according to an embodiment of the present invention has a sheet-like shape or a flat-plate shape which is thin in an upper-lower direction (Z-direction). For example, the composite magnetic sheet 10 has a size in the Z-direction, namely a thickness Tc, about 0.4 mm. The composite magnetic sheet 10 has a rectangular shape in a horizontal plane (XY-plane) perpendicular to the Z-direction. The composite magnetic sheet 10 of the present embodiment has the aforementioned shape and is suitable to be incorporated in a circuit board (not shown) when used. However, the composite magnetic sheet according to the present invention is not limited thereto but is applicable for various usages. Not only the shape and the size of the composite magnetic sheet 10 in the XY-plane but also a thickness Tc thereof are not specifically limited, provided that they are appropriate for usage.

Figure 2:
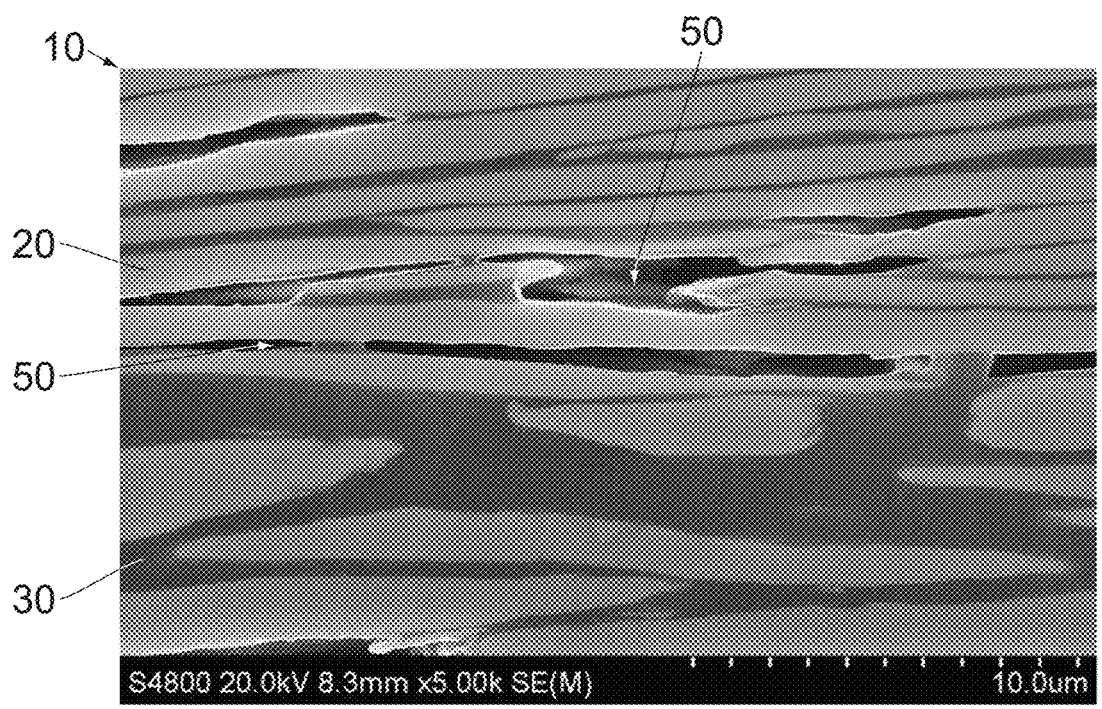
FIG. 2 is an image showing a part of the cross-section of FIG. 1.

Referring to FIGS. 1 and 2, the composite magnetic sheet 10 is made of a soft magnetic powder 20 having a flat shape which is bound by a binder (binding component) 30. The binder 30 is partially formed with pores 50. Thus, the composite magnetic sheet 10 comprises the soft magnetic powder 20 having a flat shape, the binder 30 which binds the soft magnetic powder 20 and the pores 50 which are formed in the composite magnetic sheet 10.

Figure 3:
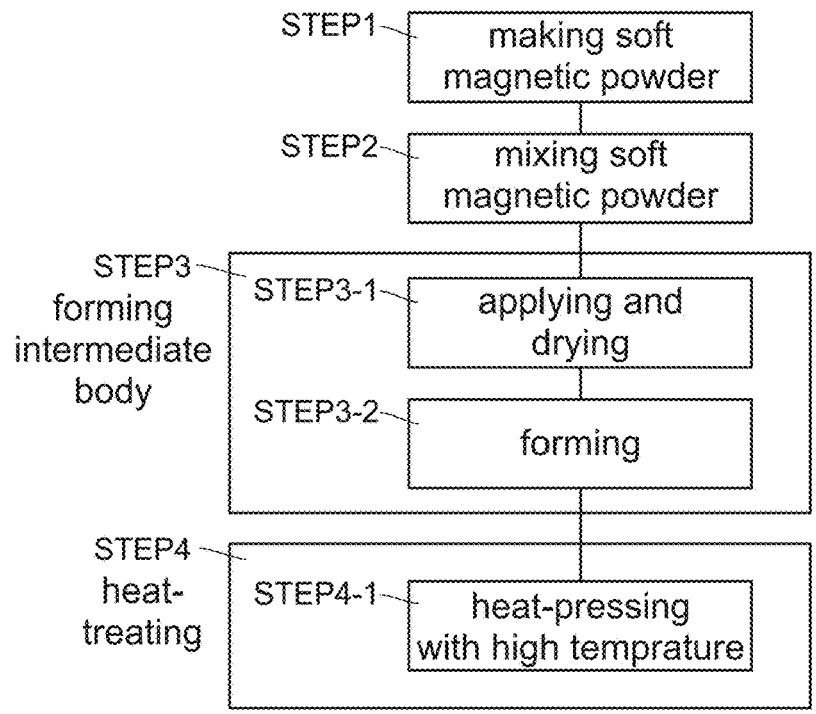
FIG. 3 is a flow chart showing a forming method of the composite magnetic sheet of FIG. 1.

Referring to FIG. 3, the composite magnetic sheet 10 of the present embodiment is made by a forming method which includes a making soft magnetic powder step (step 1), a mixing soft magnetic powder step (step 2), a forming intermediate body step (step 3) and a heat-treating step (step 4). In the forming intermediate body step, an applying and drying step (step 3-1) and a forming step (step 3-2) are performed. In the heat-treating step, a heat-pressing with high temperature (step 4-1) is performed. However, the forming method of the composite magnetic sheet 10 according to the present invention is not limited to the present embodiment but can be modified variously. Hereafter, explanation will be made about the forming method of the composite magnetic sheet 10 illustrated in FIG. 3 in the order of the aforementioned steps.

Figure 6:
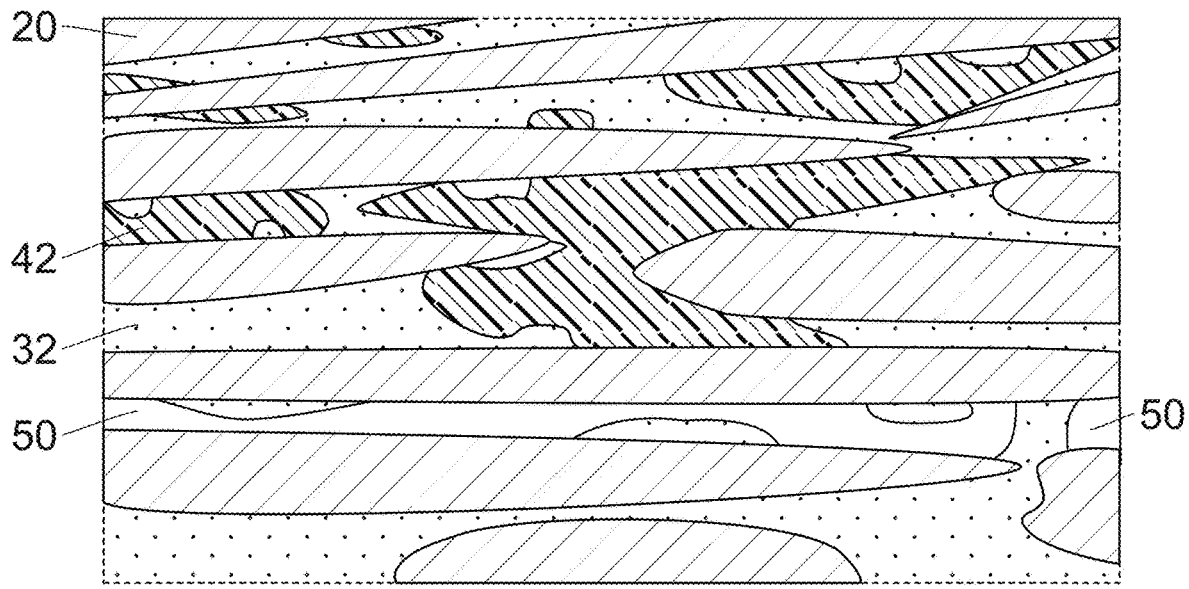
FIG. 6 is a view schematically showing a cross-section of an intermediate body which is formed in forming intermediate body of FIGS. 3 and 4, wherein the illustrated cross-section corresponds to the cross-section of FIG. 1.

Referring to FIG. 3 together with FIG. 6, in the making soft magnetic powder step, the soft magnetic powder 20 having a flat shape is made. For example, the soft magnetic powder 20 can be made of a material powder such as a soft magnetic metal powder including particles. The particles of the material powder are flattened by using a ball mill. The material powder may include only particles made of one kind of soft magnetic metal. Instead, the material powder may include particles made of two or more kinds of soft magnetic metals different from each other.

Figure 5:
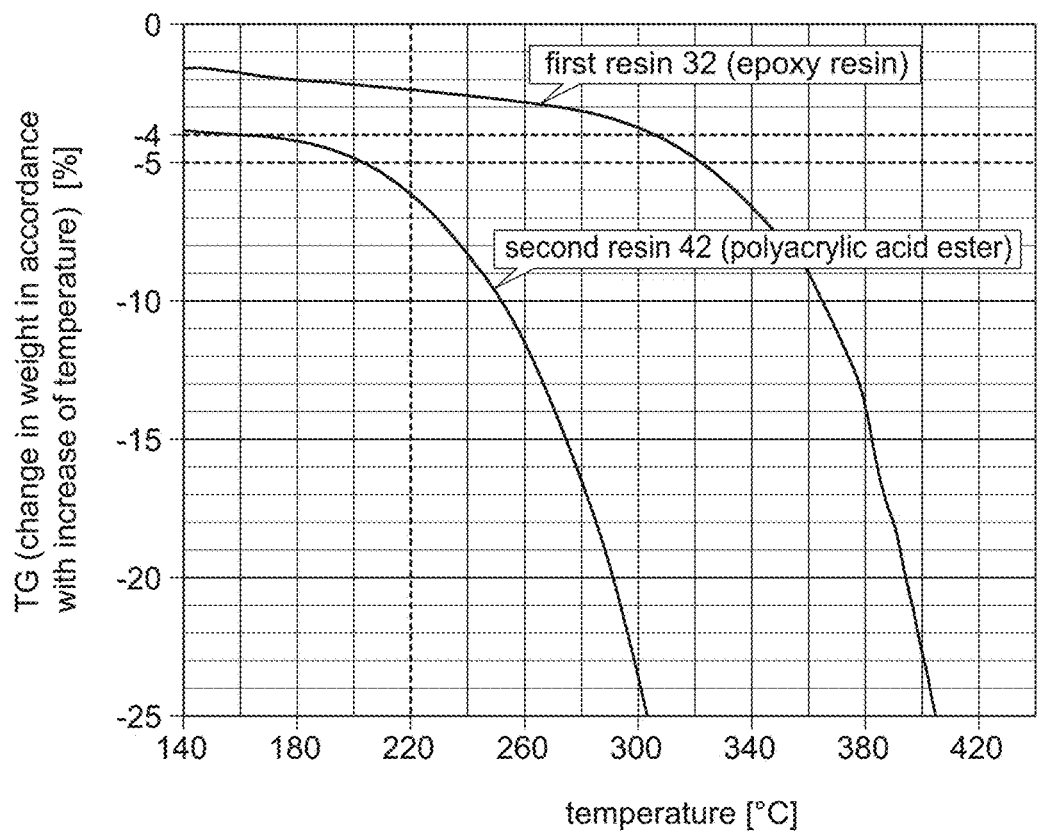
FIG. 5 is a view showing TG characteristics of a solid component of a first resin and a solid component of a second resin each of which is contained in magnetic slurry prepared in a mixing soft magnetic powder step of FIGS. 3 and 4, wherein the illustrated TG characteristics are based on measurement result which is measured in an air under a condition where temperature elevation rate is 10° C./min.

Then, in the mixing soft magnetic powder step, a solvent, a binder resin and a viscosity improver are prepared. The binder resin is resin which is hardened and binds the soft magnetic powder 20 when heated. The solvent should be liquid which is easily volatilized at a low temperature about under 60° C. For example, glycol can be used as the solvent. Referring to FIG. 5, for the binder resin and the viscosity improver, a first resin 32 and a second resin 42 having thermo-gravimetric (TG) characteristics different from each other are used, respectively.

As shown in FIG. 5, the second resin 42 is decomposed and is reduced in weight at a low temperature in comparison with the first resin 32. In detail, each of the first resin 32 and the second resin 42 contains a solid component which is, at least in part, decomposed upon heating to generate gas. In particular, each of the first resin 32 and the second resin 42 of the present embodiment is made of only the solid component except for a slight impurities which are unintentionally contained. The solid component of the first resin 32 is hardly decomposed even if temperature is risen within a temperature range under 300° C. so that weight loss of the solid component is kept low. The weight loss of the solid component of the first resin 32 is 4.0% or less at 220° C. In contrast, the solid component of the second resin 42 is significantly decomposed as temperature is risen within a temperature range of 200° C. or more so that weight loss of the solid component is significantly made high. The weight loss of the solid component of the second resin 42 is 5.0% or more at 220° C.

The first resin 32 of the present embodiment is made of epoxy resin. The second resin 42 of the present embodiment is made of polyacrylic acid ester. However, the present invention is not limited thereto. The first resin 32 may be made of any organic resin, provided that the organic resin has TG characteristics in which the weight loss of the solid component is 4.0% or less at 220° C. The second resin 42 may be made of any organic resin, provided that the organic resin has TG characteristics in which the weight loss of the solid component is 5.0% or more at 220° C.

Referring to FIG. 3 together with FIG. 6, in the mixing soft magnetic powder step, the aforementioned materials, i.e. the soft magnetic powder 20, the solvent, the binder resin and the viscosity improver, are mixed to make a mixture. When the mixture is made, the amounts of materials should be adjusted so that the mixture has enough fluidity and viscosity to be applied evenly on a substrate.

The mixture which is made as described above contains only the soft magnetic powder 20, the solvent, the binder resin and the viscosity improver. The binder resin is made of one kind of the first resin 32. The viscosity improver is made of one kind of the second resin 42. However, the present invention is not limited thereto. For example, the mixture may contain another material in addition to the aforementioned materials. For example, the mixture may contain a third resin which has TG characteristics different from those of the first resin 32 and the second resin 42. The third resin may work as the binder resin together with the first resin 32. Thus, the binder resin may contain the first resin 32 and the third resin. In this instance, the third resin may be made of phenol resin.

Referring to FIG. 3, in the mixing soft magnetic powder step, the mixture which is made as described above is poured into a container. The mixture in the container is stirred so that magnetic slurry is obtained. The second resin 42 of the present embodiment, i.e. the viscosity improver made of polyacrylic acid ester, is incompatible to the first resin 32, i.e. the binder resin made of epoxy resin. This incompatibility does not allow the second resin 42 to be completely homogeneously mixed with the first resin 32 even when the mixture is stirred. In detail, the second resin 42 is partially mixed with the first resin 32 but is partially segregated from the first resin 32. In other words, the mixture contains segregated parts of the second resin 42 formed therein.

Summarizing the explanation described above with reference to FIG. 6, the forming method of the composite magnetic sheet 10 (see FIG. 1) of the present embodiment comprises mixing at least the soft magnetic powder 20, the first resin 32 and the second resin 42 to form the magnetic slurry (see FIG. 3), the soft magnetic powder 20 having a flat shape, the first resin 32 having the solid component, weight loss of the solid component of the first resin 32 being 4.0% or less at 220° C., the second resin 42 having the solid component, weight loss of the solid component of the second resin 42 being 5.0% or more at 220° C.

Referring to FIG. 3 together with FIG. 6, in the applying and drying step of the forming intermediate body step, the magnetic slurry is applied on a substrate. For example, the substrate is a film made of polyethylene terephthalate (PET). The magnetic slurry applied on the substrate is heated to a temperature about 60° C. so that the solvent, which is a low-temperature volatile component, in the magnetic slurry is volatilized, and thereby a preliminary body is formed. The preliminary body has a thin sheet-like shape. The preliminary body is formed of material having flexibility and can be pressure-molded.

In the forming step of the forming intermediate body step, the preliminary body is punched into a required shape so that sheets are made. A predetermined number of the sheets are stacked so that the composite magnetic sheet 10 (see FIG. 1) having a required thickness can be obtained. The-thus stacked sheets form an intermediate body 14 having a sheet-like shape or a flat-plate shape. The number of the stacked sheets may be designed depending on usage of the composite magnetic sheet 10. For example, when the required composite magnetic sheet 10 can be formed of a single sheet, there is no need to stack the sheets. In other words, the number of the stacked sheets may be one. Instead, the number of the stacked sheets may be about 15, for example. The stacked sheets may be compressed by a forming pressure. The forming pressure may be a high pressure about 2 MPa.

Referring to FIG. 6, the low-temperature volatile component contained in the magnetic slurry is almost completely volatilized and does not substantially remain in the intermediate body 14. Thus, the intermediate body 14 substantially contains only the soft magnetic powder 20, the solid component of the first resin 32 and the solid component of the second resin 42 as its components. Hereafter, the remaining solid component of the first resin 32 is simply referred to "first resin 32", and the remaining solid component of the second resin 42 is simply referred to "second resin 42". The particles of the soft magnetic powder 20 are oriented roughly along the horizontal plane while being slightly reduced in thickness by the forming pressure. The first resin 32 binds the particles of the soft magnetic powder 20 to each other. The second resin 42 is partially mixed with the first resin 32 while being partially segregated. Thus, the intermediate body 14 contains the segregated parts of the second resin 42. In addition, the intermediate body 14 contains a small amount of the pores 50. The pores 50 mainly contains air which is entrapped in the magnetic slurry during the formation of the magnetic slurry.

Summarizing the explanation described above, the forming method of the composite magnetic sheet 10 (see FIG. 1) of the present embodiment comprises forming the intermediate body 14 having a sheet-like shape (see FIG. 3) from the magnetic slurry.

Referring to FIG. 3, in the heat-pressing with high temperature step of the heat-treating step, the intermediate body 14 (see FIG. 6) is protected by a release sheet. Then, while a high pressure about 25 kgf/cm² or more is applied to the thus-protected intermediate body 14, the intermediate body 14 is heated to a heat-treatment temperature between 220° C. and 400° C. (both inclusive) and held at the heat-treatment temperature for a predetermined time.

Referring to FIGS. 1 and 6, by the heat-treatment with high temperature, the first resin 32 is finally hardened to form the binder 30 and binds the particles of the soft magnetic powder 20 to each other. The first resin 32 forms fluid phase before being finally hardened. The second resin 42 is decomposed in the fluid phase to generate gas. In detail, parts of the second resin 42 mixed with the first resin 32 are decomposed, and the segregated parts of the second resin 42 are decomposed and form the pores 50. The pores 50 formed of the segregated parts are connected to each other and form discharge passages each of which extends from a deep layer to a surface layer of the intermediate body 14. The gas generated by the decomposition of the second resin 42 and the air entrapped in the pores 50 are discharged outward from the intermediate body 14 through the discharge passages because of the high pressure applied to the intermediate body 14.

The aforementioned discharge of the gas and the air further widen the discharge passages so that open pores are formed. The open pores open outward at various parts of the surface of the intermediate body 14. In addition, the discharge of the gas and the air improves the filling rate of metal of the intermediate body 14, i.e. volume ratio of the soft magnetic powder 20 to the intermediate body 14. For example, the filling rate of metal of the intermediate body 14 is improved by 5% or more.

Summarizing the explanation described above with reference to FIG. 3, the forming method of the composite magnetic sheet 10 (see FIG. 1) of the present embodiment comprises heat-treating the intermediate body 14 (see FIG. 6) at a heat-treatment temperature between 220° C. and 400° C. (both inclusive). In particular, the heat-treating of the present embodiment includes the heat-pressing the intermediate body 14 at the heat-treatment temperature between 220° C. and 400° C. (both inclusive).

Referring to FIGS. 1 and 6, the composite magnetic sheet 10 of the present embodiment is the intermediate body 14 to which the aforementioned heat-treating step (see FIG. 3) is applied. As previously described, the composite magnetic sheet 10 of the present embodiment is incorporated in a circuit board (not shown) when used. The circuit board is usually provided with various electronic components (not shown) which are mounted thereon. When these electronic components are fixed on and connected to the circuit board, soldering is required. Recently, a lead-free reflow process is performed when something is soldered on a circuit board.

The lead-free reflow process is usually performed under a relatively high reflow temperature of 220° C. or more. The weight of a viscosity improver of an existing composite magnetic sheet is significantly lost on ignition at this reflow temperature. On the contrary, a heat-treatment for making the existing composite magnetic sheet is usually performed under a temperature of about 200° C. The viscosity improver of the composite magnetic sheet is not sufficiently decomposed under this temperature of about 200° C. but is significantly decomposed during the reflow process which is performed when the composite magnetic sheet is incorporated in the circuit board. The decomposition of the viscosity improver during the reflow process generates gas in the composite magnetic sheet, and this generated gas might cause the expansion of the composite magnetic sheet.

In contrast, the composite magnetic sheet 10 of the present embodiment is made of the magnetic slurry which contains the first resin 32 and the second resin 42. Under a usual reflow temperature, the first resin 32 is slightly decomposed, while the second resin 42 is significantly decomposed in comparison with the first resin 32. Moreover, the heat-treatment for making the composite magnetic sheet 10 is performed under a temperature equal to or more than the usual reflow temperature. According to the forming method of the present embodiment, the first resin 32 forms the binder 30 of the composite magnetic sheet 10 during the heat-treatment while being slightly decomposed. The thus-formed binder 30 is hardly decomposed even during a reflow process. Moreover, the second resin 42 is sufficiently decomposed in advance during the heat-treatment so that generation of gas in accordance with the decomposition of the second resin 42 can be reduced during the reflow process. Thus, the present embodiment provides the composite magnetic sheet 10, which is capable of reducing expansion thereof during the reflow process.

As can be seen from the explanation described above, the heat-treatment temperature during the heat-treatment of the present embodiment should be equal to or more than the reflow temperature of the reflow process which is to be performed to a circuit board (not shown) containing the composite magnetic sheet 10. Considering that the usual reflow temperature is about 220° C., the heat-treatment temperature should be 220° C. or more. Moreover, from a viewpoint of more sufficient decomposition of the second resin 42 by the heat-treatment (see FIG. 3), the heat-treatment temperature may be higher. For example, the heat-treatment temperature may be equal to or more than 260° C. and may be equal to or more than 300° C. However, when the heat-treatment temperature is too high, the first resin 32 might be excessively decomposed, and thereby the binder 30 might be insufficiently formed. From a viewpoint of prevention of exceed decomposition of the first resin 32, the heat-treatment temperature should be 400° C. or less.

If the amount of the first resin 32 to the soft magnetic powder 20 in the magnetic slurry is lower than 2 weight %, the binder 30 of the composite magnetic sheet 10 might be insufficiently formed, and thereby the composite magnetic sheet 10 having a required strength might not be obtained. On the contrary, if the amount of the first resin 32 to the soft magnetic powder 20 is higher than 15 weight %, the filling rate of the soft magnetic powder 20 of the composite magnetic sheet 10 is lowered, and thereby the composite magnetic sheet 10 having required magnetic properties might not be obtained. Therefore, the ratio of the first resin 32 to the soft magnetic powder 20 in the magnetic slurry is preferred to be between 2 and 15 weight % (both inclusive).

If the amount of the second resin 42 to the first resin 32 in the magnetic slurry is lower than 20 weight %, the magnetic slurry having a required viscosity might not be obtained, and thereby the homogeneous intermediate body 14 might not be obtained. On the contrary, if the amount of the second resin 42 to the first resin 32 is higher than 150 weight %, the binder 30 of the composite magnetic sheet 10 might not securely bind the soft magnetic powder 20, and thereby the composite magnetic sheet 10 having a required strength might not be obtained. Therefore, the ratio of the second resin 42 to the first resin 32 in the magnetic slurry is preferred to be between 20 and 150 weight % (both inclusive).

Figure 4:
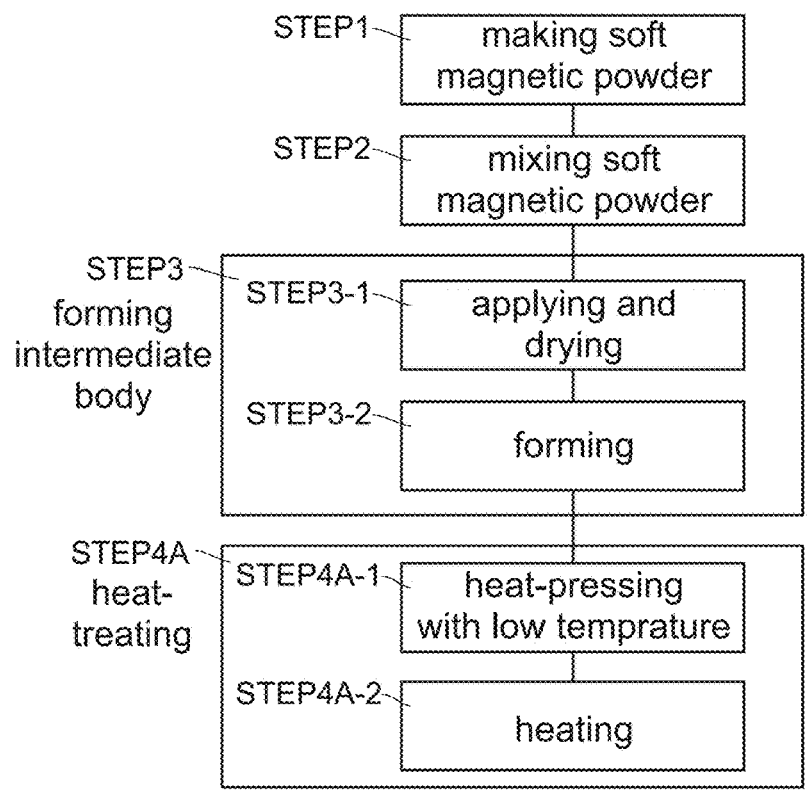
FIG. 4 is another flow chart showing a modification of the forming method of FIG. 3.

Referring to FIGS. 3 and 4, the forming method of the composite magnetic sheet 10 (see FIG. 1) of the present invention is not limited to the forming method described above but can be modified to the forming methods such as that illustrated in FIG. 4. The forming method of the composite magnetic sheet 10 of the present modification comprises the making soft magnetic powder step (step 1), the mixing soft magnetic powder step (step 2) and the forming intermediate body step (step 3) same as those of the forming method described above while comprising a heat-treating step (step 4A) different from the heat-treating step (step 4).

Referring to FIG. 4, the heat-treating step (step 4A) of the present modification includes a heat-pressing with low temperature step (step 4A-1) and a heating step (step 4A-2). In the heat-pressing with low temperature step, the intermediate body 14 (see FIG. 6) is heat-pressed by a relatively low temperature of 200° C. or less. In the heating step after the heat-pressing, the intermediate body 14 is heated to a heat-treatment temperature between 220° C. and 400° C. (both inclusive). During the heat-pressing with low temperature step of the present modification, some amount of gas is generated, and the open pores are formed. The gas and the air are discharged during the heating step. There are only a limited number of types of release sheets which can withstand the temperature of 220° C. or more in the heat-pressing with high temperature step (see FIG. 3). According to the heat-pressing with low temperature step of the present modification, various types of release sheets can be used.

Referring to FIGS. 3 and 4, the forming method of the composite magnetic sheet 10 (see FIG. 1) according to the present invention is not limited to those of the already described embodiment and modifications but can be further variously modified as described below.

In each of the heat-pressing with high temperature step and the heat-pressing with low temperature step, the heating of the intermediate body 14 (see FIG. 6) and the pressing of the intermediate body 14 can be simultaneously performed or can be performed at different times. However, from a viewpoint of prevention of the expansion of the intermediate body 14 which might be caused because of gas, the pressing is preferred to be performed at a time when the heating of the intermediate body 14 starts.

In each of the heat-pressing with high temperature step and the heat-pressing with low temperature step, an upper surface and a lower surface of the intermediate body 14 (see FIG. 6) may be vertically sandwiched and pressed by pressure plates. Each of these pressure plates may be a porous plate. When the porous plates are used as the pressure plates, the intermediate body 14 is formed with not only the open pores which open at sides surface thereof but also the open pores which open at the upper surface and the lower surface thereof, and thereby the gas and the air can be more efficiently discharged.

The heat-treating step can be performed under various environments. For example, the heat-treating step can be performed in air or can be performed in vacuum atmosphere. When the heat-treating step is performed in air, pore ratio, i.e. ratio of the pores 50 (see FIG. 1) to the whole composite magnetic sheet 10 (see FIG. 1), will be 2.5 volume % or more. When the heat-treating step is performed in vacuum atmosphere, the pore ratio will be close to zero. For example, the pore ratio will be less than 2.5 volume %.

Referring to FIG. 1, the composite magnetic sheet 10 of the present embodiment has the structure and the characteristics as described below because of the aforementioned forming method.

The composite magnetic sheet 10 has a cross-section having two-phase structure which is formed of a dense part and the pores 50. The dense part comprises the soft magnetic powder 20 and the binder 30 firmly adhered to each other. The pores 50 includes the open pores and closed pores. The open pores are spaces connected to each other and open outward of the composite magnetic sheet 10. Each of the closed pores is a space closed within the composite magnetic sheet 10. Almost all the pores 50 of the present embodiment are the open pores.

The binder 30 is hardly decomposed even when the composite magnetic sheet 10 is heated. In addition, the air in the pores 50 is discharged outward from the openings of the composite magnetic sheet 10 even when the air is expanded by heating. Therefore, the composite magnetic sheet 10 is hardly changed even when heat about the reflow temperature is applied. Even in a situation in which the air in the pores 50 is thermally expanded when the composite magnetic sheet 10 is used, the air is discharged outward from the openings. As can be seen from the explanation described above, the present embodiment enables to reduce the expansion of the composite magnetic sheet 10 which might be caused during the reflow process or might be caused by thermal elevation in use. Thus, the present embodiment provides the composite magnetic sheet 10 which is suitable to be incorporated in a circuit board, particularly in a printed circuit board.

For example, the fact whether the composite magnetic sheet 10 is suitable to be incorporated in a circuit board or not can be determined by a reflow test (predetermined test) which is performed to the composite magnetic sheet 10. For example, this predetermined test can be performed under a temperature condition where a holding time at a temperature of 220° C. or more is 60 seconds, another holding time at a temperature between 240° C. and 250° C. (both inclusive) is 10 seconds or less, and a peak temperature is 260° C. From a viewpoint of obtaining the composite magnetic sheet 10 which is suitable to be incorporated in a circuit board, the composite magnetic sheet 10 is preferred to be reduced in weight by 0.25% or less when the predetermined test is performed to the composite magnetic sheet 10. Moreover, in order to incorporate the composite magnetic sheet 10 into a printed circuit board which satisfies the general thickness standard, changed in thickness of the composite magnetic sheet 10 is preferred to be within ±3% upon the aforementioned predetermined test, and increase in thickness of the composite magnetic sheet 10 is particularly preferred to be less than 3% upon the aforementioned predetermined test.

When the heat-treating step (see FIGS. 3 and 4) is performed in vacuum atmosphere, ratio of the dense part to the whole composite magnetic sheet 10 is extremely high and is specifically 97.5 volume % or more. Even when the heat-treating step is performed in air, the ratio of the dense part to the whole composite magnetic sheet 10 is high and is specifically about between 80 and 97.5 volume %. The composite magnetic sheet 10 with this structure has a high strength.

Ratio of the soft magnetic powder 20 to the whole composite magnetic sheet 10 is 90 weight % or more. The composite magnetic sheet 10 has such a high filling rate of metal and thereby has magnetic properties required for the composite magnetic sheet 10 which is incorporated and used in a circuit board (not shown). However, the present invention is not limited thereto. For example, weight ratio of each of the soft magnetic powder 20, the binder 30 and the pores 50 to the composite magnetic sheet 10 may be designed based on the usage of the composite magnetic sheet 10.

The soft magnetic powder 20 of the present embodiment contains a plurality of particles each made of soft magnetic metal. All the particles are made of the same soft magnetic metal and have shapes and characteristics similar to each other. For example, each particle is made of the same Fe-based alloy having soft magnetism. Each particle has a flat shape which extends roughly along the XY-plane. However, the present invention is not limited thereto. For example, material of each particle is not limited to Fe-based alloy. The soft magnetic powder 20 may contain particles made of two or more kinds of soft magnetic metals different from each other.

The binder 30 of the present embodiment is formed by thermosetting the first resin 32 (see FIG. 6) which is made of organic resin and has substantially no inorganic substance. Thus, the binder 30 has organic substance as its main component and contains substantially no inorganic substance such as silicon oxide.

After the composite magnetic sheet 10 is formed as described above, the composite magnetic sheet 10 may be impregnated with resin such as phenol resin, acrylic resin or epoxy resin so that the open pores of the pores 50 of the composite magnetic sheet 10 are filled with resin. In other words, the pores 50 may be, at least in part, filled with resin. When the pores 50 is filled as described above, intrusion of moisture in the air to the pores 50 can be prevented, and thereby expansion of the composite magnetic sheet 10 due to thermal variation in use can be reduced.

EXAMPLES

Hereafter, more specific explanation will be made about the present invention with reference to Examples and Comparative examples of the composite magnetic sheets according to the present invention. Examples and Comparative examples of the composite magnetic sheets were made as described below, and characteristics thereof were measured as described below.

(Making Soft Magnetic Powder)

Fe-based alloy powder was used as a material of a soft magnetic powder. The powder was flattened by using a ball-mill.

(Forming Magnetic Slurry)

A solvent, a binder resin (first resin) and a viscosity improver (second resin) were prepared. Glycol was used as the solvent. Epoxy resin was used as the binder resin. Polyacrylic acid ester was used as the viscosity improver. Examples 1 to 3 of mixtures were prepared by mixing the soft magnetic powder, the solvent, the binder resin and the viscosity improver in such a ratio that the magnetic slurry of Table 1 could be obtained. The mixture was poured into a container. Each of Examples 1 to 3 of magnetic slurry shown in Table 1 was formed by stirring the mixture in the container. In each magnetic slurry, the viscosity improver was partially segregated from the binder resin.

TABLE 1

|  | components contained in magnetic slurry [weight %] | | | | ratio to soft magnetic powder [weight %] | | |
| --- | --- | --- | --- | --- | --- | --- | --- |
|  | soft magnetic powder | epoxy resin | polyacrylic acid ester | glycol | epoxy resin | polyacrylic acid ester | (*1) |
| Example 1 | 37.7 | 1.5 | 0.4 | 60.4 | 4.0 | 1.1 | 26.7 |
| Example 2 | 37.6 | 1.5 | 0.8 | 60.1 | 4.0 | 2.1 | 53.3 |
| Example 3 | 37.5 | 1.5 | 1.1 | 59.9 | 4.0 | 2.9 | 73.3 |

(*1) ratio of polyacrylic acid ester to epoxy resin [weight %]

(Forming Intermediate Body)

Examples 1 to 3 of the magnetic slurry were applied on films, respectively, by using a slot die. Each of the films was made of polyethylene terephthalate (PET). Thereafter, Examples 1 to 3 of the magnetic slurry were dried at temperature of 60° C. for 1 hour so that the solvent was volatilized. As a result, Examples 1 to 3 of preliminary bodies were formed. Examples 1 to 3 of the preliminary bodies were cut by using trimming die, and thereby a plurality of rectangular sheets were made. Each of the rectangular sheets had a lateral size of 26 to 27 mm and a vertical size of 14 to 15 mm. Each of Examples 1 to 3 of intermediate bodies was made by stacking a predetermined number of the rectangular sheets. For each of Examples 1 to 3, a plurality of the intermediate bodies were made. The thus-obtained intermediate bodies contained the components of the ratio shown in Table 2.

TABLE 2

| | components contained in intermediate body [weight %] | | |
| --- | --- | --- | --- |
| | soft magnetic powder | epoxy resin | polyacrytic acid ester |
| Example 1 | 95.2 | 3.8 | 1.0 |
| Example 2 | 94.3 | 3.8 | 1.9 |
| Example 3 | 93.5 | 3.7 | 2.8 |

Forming Examples 1 to 3 of Composite Magnetic Sheets

Each of Examples 1 to 3 of the intermediate bodies was protected by a release sheet and was put into a die. While a high pressure about 50 kgf/cm2 was applied to the intermediate body in the die, the intermediate body was heated to a heat-treatment temperature of 300° C. and was held at the heat-treatment temperature for 1 hour. As a result, for each of Examples 1 to 3, a plurality of composite magnetic sheets were made. Each of the composite magnetic sheets had a thickness about 2 to 4 mm.

Forming Comparative Examples 1 to 3 of Composite Magnetic Sheets

Each of Examples 1 to 3 of the intermediate bodies was protected by a release sheet and was put into a die. While a high pressure about 50 kgf/cm$^2$ was applied to the intermediate body in the die, the intermediate body was heated to a heat-treatment temperature of 200° C. and was held at the heat-treatment temperature for 1 hour. As a result, for each of Comparative examples 1 to 3, a plurality of composite magnetic sheets were made. Each of the composite magnetic sheets had a thickness about 2 to 4 mm.

(Reflow Test)

A reflow process at a temperature of 260° C. was performed once for each of Examples 1 to 3 and Comparative examples 1 to 3 of the composite magnetic sheets. Change in weight and change in thickness by the reflow process were measured. In the reflow process, the composite magnetic sheet was heated so that the temperature of the composite magnetic sheet was monotonically raised to 260° C. In this temperature increase process, the composite magnetic sheet was held at a temperature of 220° C. or more for 60 seconds and thereafter was held at a temperature between 240 and 250° C. for 10 seconds or less. The measurement result is shown in Table 3 and FIGS. 7 and 8.

TABLE 3

| | ratio of soft magnetic powder to whole composite magnetic sheet [weight %] | heat treatment temperature in reflow process | change in composite magnetic sheet by reflow process | |
|---|---|---|---|---|
| | | | weight loss [%] | increase in thickness [%] |
| Example 1 | 95.7 | 300° C. | 0.05 | 0.32 |
| Example 2 | 95.2 | | 0.09 | 0.04 |
| Example 3 | 94.7 | | 0.11 | 0.25 |
| Comparative example 1 | 95.4 | 200° C. | 0.26 | 6.08 |
| Comparative example 2 | 94.6 | | 0.36 | 11.62 |
| Comparative example 3 | 93.8 | | 0.47 | 15.20 |

Figure 7:
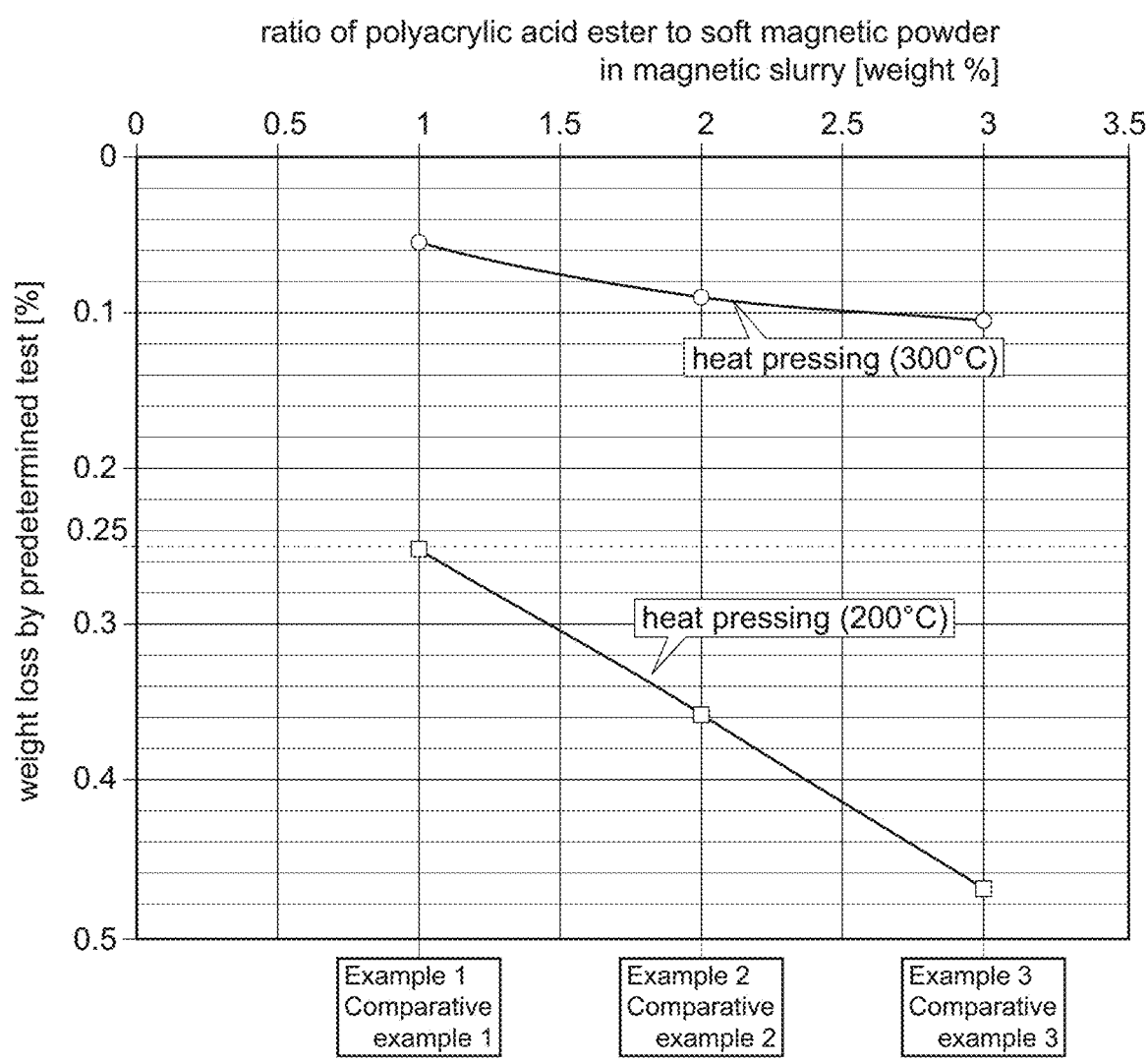
FIG. 7 is a view showing weight loss by a predetermined test of Examples 1 to 3 and Comparative examples 1 to 3 of the composite magnetic sheets of the present invention.
Figure 8:
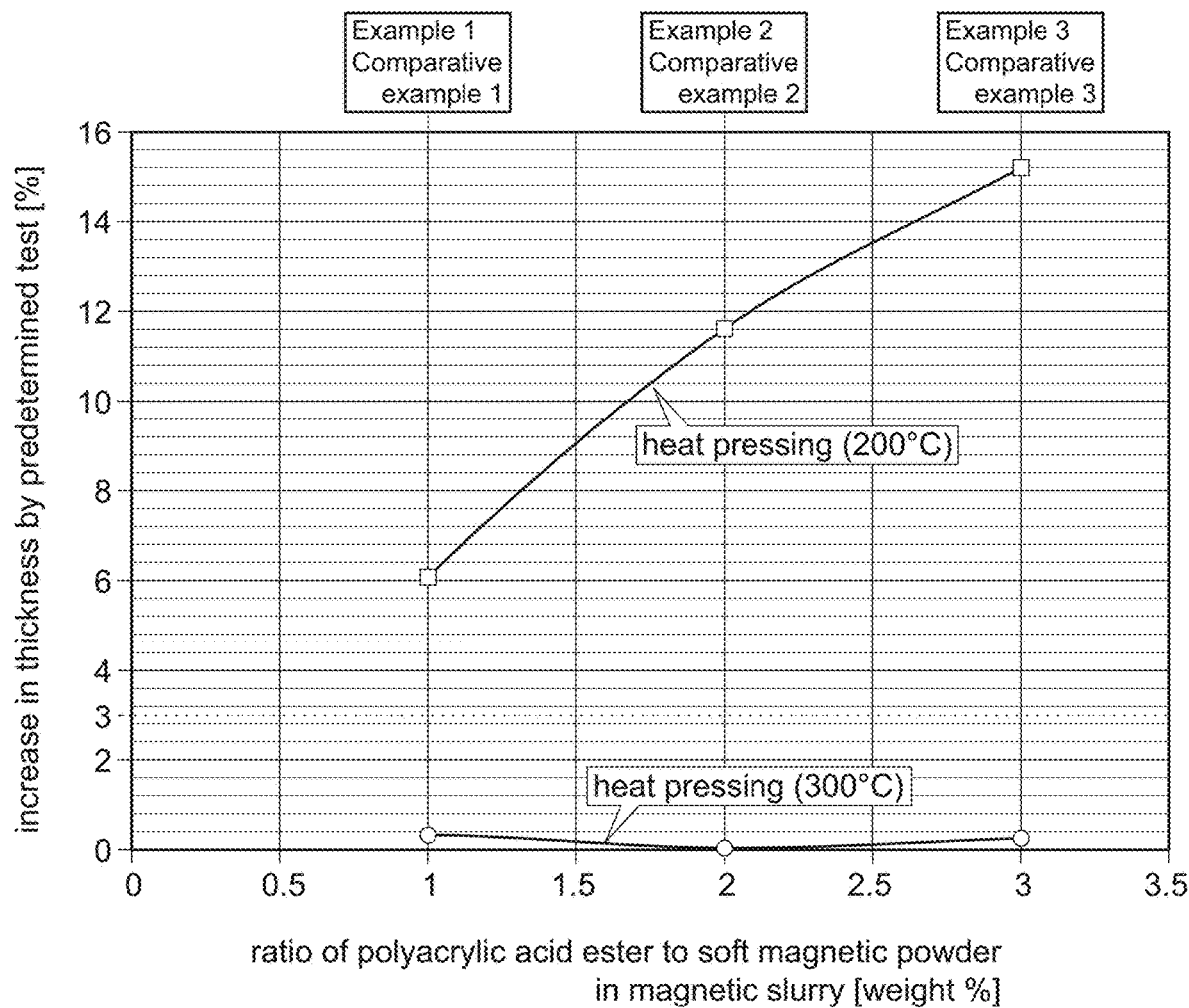
FIG. 8 is a view showing increase in thickness by the predetermined test of Examples 1 to 3 and Comparative examples 1 to 3.

Referring to Tables 1 and 3 and FIGS. 7 and 8, for each of Examples 1 to 3 of the composite magnetic sheets which are heat-treated at 300° C., weight loss is 0.12% or less, and increase in thickness is 0.4% or less regardless of the ratio of polyacrylic acid ester to the soft magnetic powder in the magnetic slurry. It is considered that each of Examples 1 to 3 of the composite magnetic sheets substantially contains no remaining composition of polyacrylic acid ester, and thereby it is hardly changed during the reflow process.

In contrast, for Comparative examples 1 to 3 of the composite magnetic sheets which are heat-treated at 200° C., as the ratio of polyacrylic acid ester to the soft magnetic powder in the magnetic slurry is higher, weight loss and increase in thickness rapidly become higher. It is considered that each of Comparative examples 1 to 3 of the composite magnetic sheets which are heat-treated at 200° C. contains a large amount of remaining composition of polyacrylic acid ester. It is considered that this remaining composition is decomposed to generate gas during the reflow process so that the composite magnetic sheets is expanded.

(Strength Test)

Figure 9:
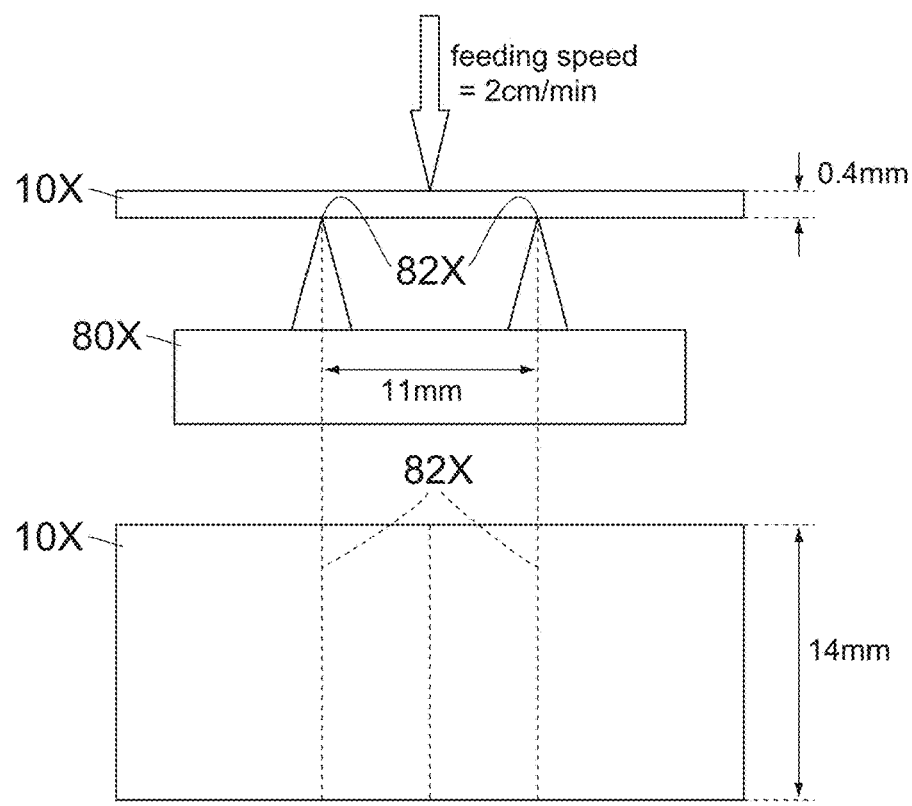
FIG. 9 is a view showing measurement method of the strength of the composite magnetic sheet.

A strength test was performed to each of Example 3 and Comparative example 3 of composite magnetic sheets 10X as described below. Referring to FIG. 9, the composite magnetic sheet 10X was supported by two support portions 82X of a support stand 80X. Stress and distortion were measured while the middle point of the composite magnetic sheet 10X is pressed with a feeding speed of 2 cm/min. The measurement result is shown in FIG. 10.

Figure 10:
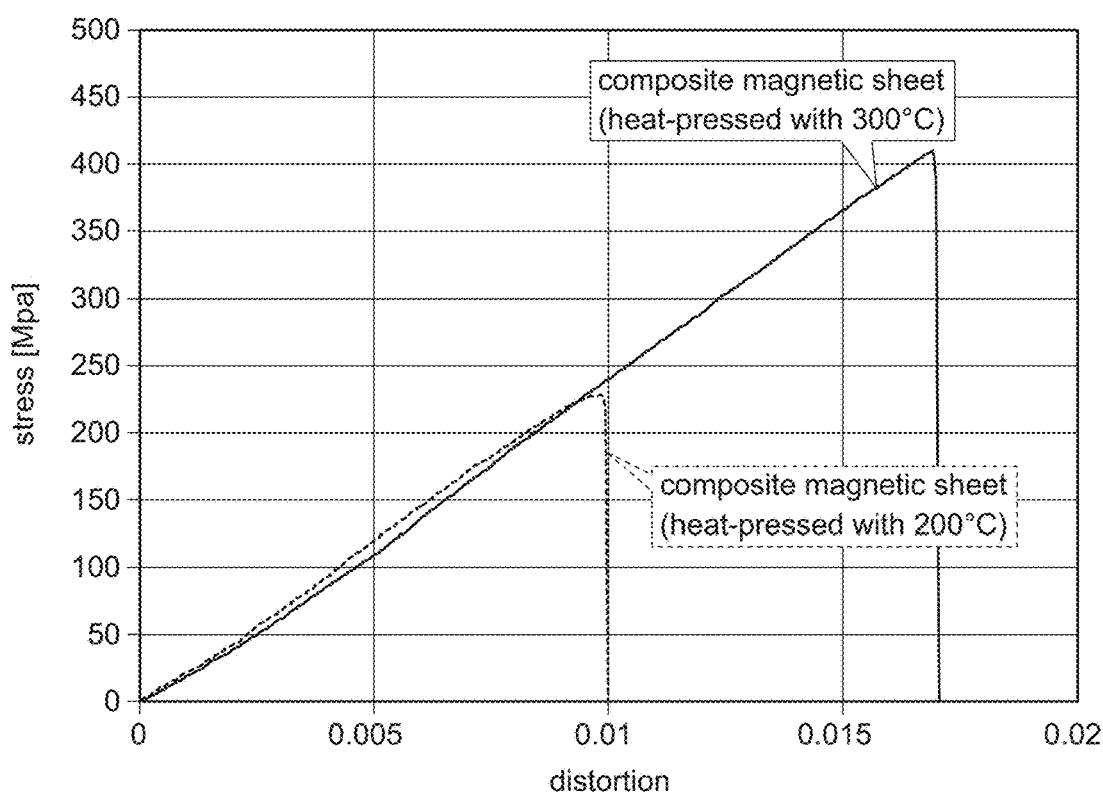
FIG. 10 is a view showing stress-distortion curve of Example 3 and Comparative example 3 measured by the measurement method of FIG. 9.

Referring to FIG. 10, The strength of Example 3 of the composite magnetic sheet which is heat-treated at 300° C. is significantly improved in comparison with that of Comparative example 3 of the composite magnetic sheet which is heat-treated at 200° C.

(Measurement of Characteristics)

For each of Example 3 and Comparative example 3 of the composite magnetic sheets, density and permeability, more specifically real component μ' of complex relative permeability at frequency of 1 MHz, were measured. The density and the permeability of Example 3 of the composite magnetic sheet were 4.50 g/cc and 270, respectively. The density and the permeability of Comparative example 3 of the composite magnetic sheet were 4.25 g/cc and 230, respectively. This measurement result shows that the density and the permeability of the composite magnetic sheet is improved by the heat-treatment at 300° C.

What is claimed is:

1. A forming method of a composite magnetic sheet, the forming method comprising:
    mixing at least a soft magnetic powder, a first resin and a second resin to form magnetic slurry, the soft magnetic powder having a flat shape, the first resin having a solid component, weight loss of the solid component of the first resin being 4.0% or less at 220° C., the second resin having a solid component, weight loss of the solid component of the second resin being 5.0% or more at 220° C.;
    forming an intermediate body having a sheet-like shape from the magnetic slurry; and
    heat-treating the intermediate body at a heat-treatment temperature between 260° C. and 400° C. (both inclusive), whereby the first resin forms a binder which binds particles of the soft magnetic powder to each other,
    wherein the first resin is an organic resin, and the binder has an organic substance as its main component.

2. The forming method as recited in claim 1, wherein in the magnetic slurry, a ratio of the first resin to the soft magnetic powder is between 2 and 15 weight % (both inclusive), and a ratio of the second resin to the first resin is between 20 and 150 weight % (both inclusive).

3. The forming method as recited in claim 1, wherein:
    the first resin is made of epoxy resin; and
    the second resin is made of polyacrylic acid ester.

4. The forming method as recited in claim 1, wherein the second resin is incompatible to the first resin.

5. The forming method as recited in claim 1, wherein the heat-treating includes heat-pressing the intermediate body at the heat-treatment temperature.

6. The forming method as recited in claim 1, wherein the heat-treating includes heat-pressing the intermediate body at a temperature of 200° C. or less and heating the intermediate body to the heat-treatment temperature after the heat-pressing.

* * * * *